April 6, 1926.
J. D. PUGH
1,579,658
CAR WEIGHING SCALE
Filed July 18, 1921
3 Sheets-Sheet 1
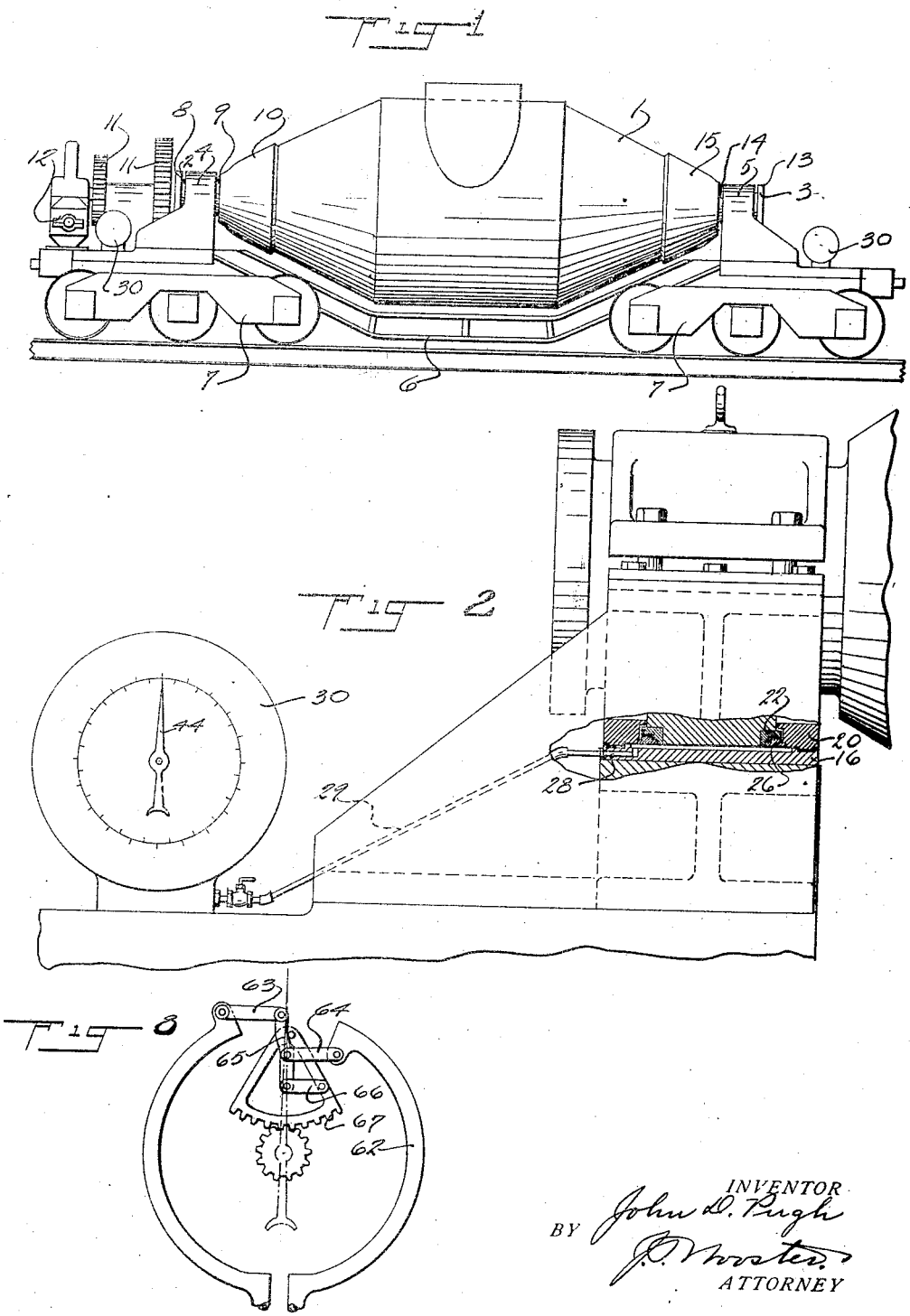

April 6, 1926.
J. D. PUGH
CAR WEIGHING SCALE
Filed July 18, 1921
1,579,658
3 Sheets-Sheet 2
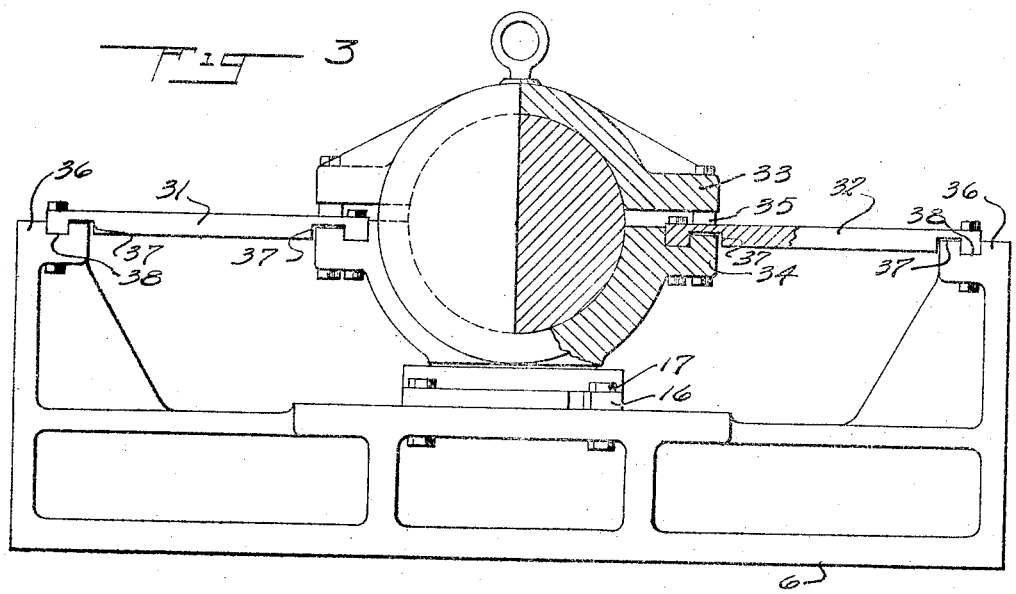
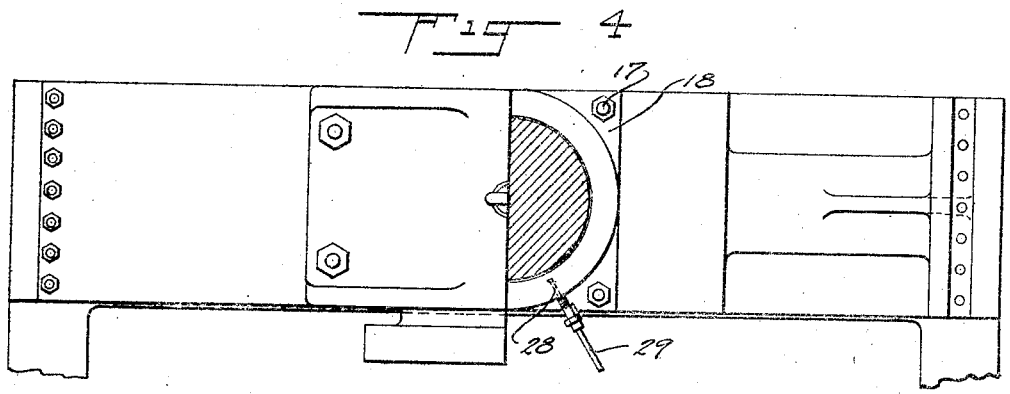
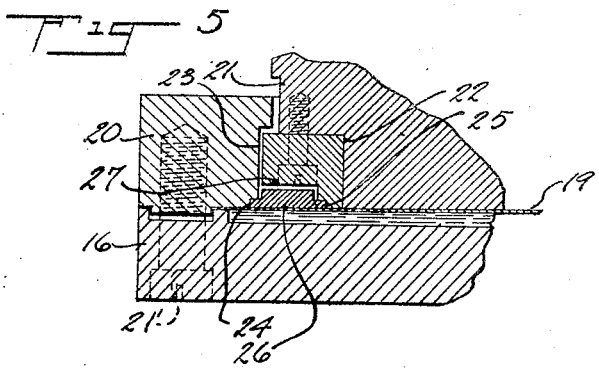
INVENTOR
John D. Pugh,
BY
ATTORNEY April 6, 1926.
J. D. PUGH
1,579,658
CAR WEIGHING SCALE
Filed July 18, 1921
3 Sheets-Sheet 3
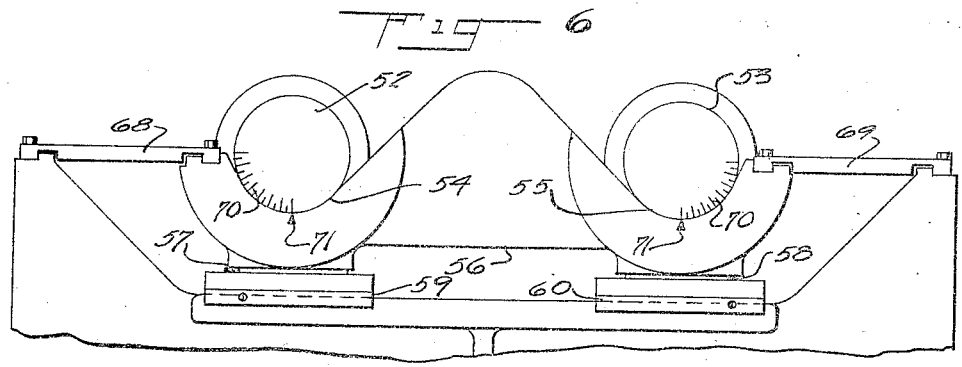
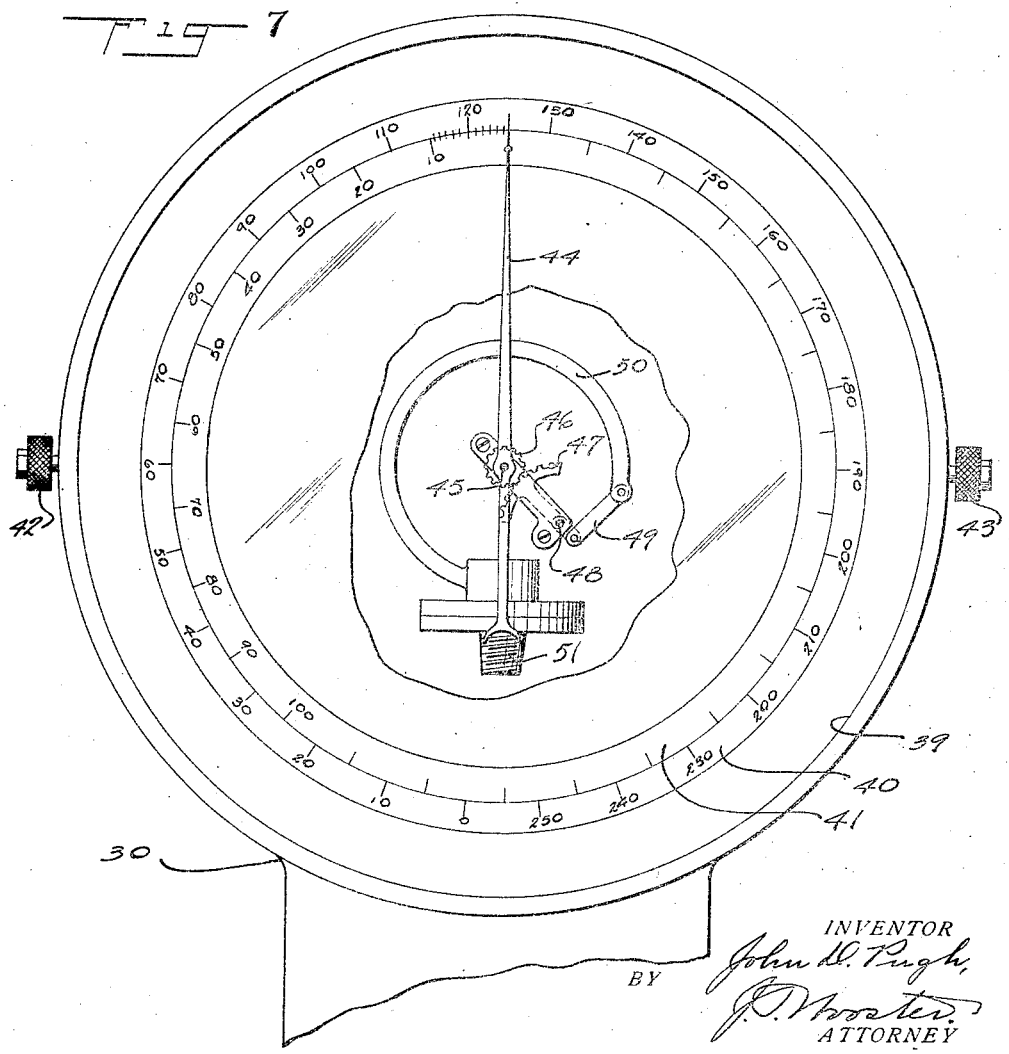
INVENTOR
John D. Pugh,
BY
ATTORNEY Patented Apr. 6, 1926.

1,579,658

UNITED STATES PATENT OFFICE.

JOHN D. PUGH, OF MOUNT WASHINGTON, MARYLAND.

CAR-WEIGHING SCALE.

Application filed July 18, 1921. Serial No. 485,419.

*To all whom it may concern:*

Be it known that I, JOHN D. PUGH, a citizen of the United States, and resident of Mount Washington, in the city of Baltimore and State of Maryland, have invented certain new and useful Improvements in Car-Weighing Scales, of which the following is a specification.

This invention relates to car weighing scales, and more particularly to scales carried by the car itself and available at any time or place to indicate the gross or net weight of the car body and contents without recourse to railroad track scales. Such a device is of particular advantage in large capacity hot metal cars when delivering a partial charge to different receptacles, enabling the operator to determine when he has poured out the desired quantity at any given point; likewise, when the car is receiving a partial charge, and for a multitude of like uses.

The specific weighing device comprises a pressure cylinder filled with a suitable liquid and sealed by a flexible diaphragm. The load to be weighed rests upon the upper surface of the diaphragm, and is supported by the liquid beneath it. As the pressure of the liquid will be directly proportional to the load, the latter may be indicated by a pressure gauge, preferably of the Bourdon tube type, calibrated in suitable units of weight. As the weight of the car body and contents is distributed either equally or in some fixed proportion at either end of the car, weighing means need only be installed in one end, the correct indication being taken care of by the calibration of the dial. Where a tilting motor is connected to one end of the car body, the weighing device may be positioned at the opposite end. In car bodies mounted on a pair of laterally spaced trunnions at either end, a pair of pressure cylinders may be positioned beneath the respective trunnions at one end of the car, and the total weight indicated by a dial pointer actuated, through suitable linkage, by a pair of Bourdon tubes connected respectively to the pressure cylinders.

With these and other objects in view, I have devised the apparatus embodying my invention as described in the following specification and illustrated in the accompanying drawings, of which—

Figure 1 is a side elevation of a hot metal weighing car of the central trunnion type, Figure 2 is an enlarged side elevation and part section of the trunnion, bearing and scale dial shown in Figure 1, Figure 3 is an end elevation and half section of the trunnion bearing, and associated parts shown in Figure 2, Figure 4 is a half plan view and half horizontal section of the parts shown in Figure 3, Figure 5 is a diametrical section of a portion of the weighing cylinder, Figure 6 is an end view of the trunnions, bearings and associated parts in a hot metal weighing car of the double trunnion type, Figure 7 is an enlarged view of the scale dial, showing the Bourdon tube mechanism, and Figure 8 is a view of the Bourdon tube mechanism for double trunnion cars.

Referring to the drawings, 1 represents a hot metal car body having central end trunnions 2 and 3, the latter being carried in bearings 4 and 5 respectively, said bearings being mounted on car frame 6 supported by trucks 7. Frame 6 connects trucks 7 and transmits draft and bumping strains therebetween. Trunnion 2 is provided with thrust collars 8 and 9 having reasonable clearance on either side of bearing 4, and designed to take up the entire end thrust of car body 1 due to inertia, inclination of the track, or other causes. The inner end of enlargement 10 of trunnion 2 connected to car body 1 may be utilized as thrust collar 9, as shown in Figure 1. Connected to trunnion 2 by gearing 11 is dumping motor 12 mounted on frame 6. Trunnion 3 is somewhat longer than bearing 5, and has disposed on either side of the latter collars 13 and 14 respectively. Collar 14 is on the inner side of bearing 5, and may constitute merely the inner end of enlargement 15 whereby trunnion 2 is connected to car body 1. Between bearing 5 and each of collars 13 and 14 are clearances which are respectively greater than the corresponding clearances between bearing 4 and collars 8 and 9, to an extent sufficient to prevent end thrust from being normally transmitted through trunnion 3 into bearing 5 under normal conditions. Collars 13 and 14 are merely to prevent trunnion 3 from slipping through bearing 5 in case of accident.

Bearings 4 and 5 may be of any desired type; in the car here shown, (Figures 1 to 4 inclusive) they are ordinary split bearings. Bearing 4 is secured to frame 6 in the usual manner. Between bearing 5 and frame 6, is weighing cylinder 16. The latter is a flat shallow open ended cylinder, the walls and the closed end being integral. Bolts 17 through square corners 18 secure cylinder 16 to frame 6. A flexible diaphragm 19, preferably of sheet metal, closes the open end of cylinder 16, and is clamped to the latter by an annular ring 20 held by screws 21' through the cylinder walls. Bearing directly upon the upper surface of diaphragm 19 and constituting, or rigidly secured to, the base of bearing 5, is plunger 21. To prevent accidental displacement of plunger 21, an annular retaining ring 22 of greater external diameter is notched into its lower end, and the inner surface of ring 20 is undercut as at 23 to accommodate retaining ring 22 with reasonable clearance, while the upper portion of the inner surface of ring 20 is of less diameter than the external diameter of retaining ring 22 and overhangs the latter, thus preventing withdrawel without first disassembling. The diameter of plunger 21 is sufficiently less than the internal diameter of the overhanging portion of ring 20 to provide reasonable clearance therebetween. The lower inner edge of ring 20 and the lower outer edge of retaining ring 22 are provided with annular notches 24 and 25 respectively, into which is accurately fitted a hard steel bridge ring 26, which rests upon diaphragm 19 and serves as a means for centering plunger 21, thus preventing friction between plunger 21 or retaining ring 22 and ring 20. Retaining ring 22 is counter-notched as at 27 to prevent unnecessary bearing upon bridge ring 26. The interior of cylinder 16 is filled with water, oil, glycerine, mercury, or other suitable liquid, light machine oil or a mixture of alcohol and glycerine being preferable, and is connected by duct 28 in the closed end of cylinder 16, and by tube 29 communicating therewith, to pressure gauge 30 calibrated to read directly in units of weight.

Bearing 5 is supported against horizontal movement by stay plates 31 and 32, the same being horizontally disposed and being bolted at their inner ends to the left and right flanges respectively of the under member of bearing 5. Upper and lower flanges 33 and 34 respectively, of bearing 5, may be bolted together through spacers 35 to provide clearance between the under surfaces of flanges 33 and the upper surfaces of plates 31 and 32 respectively, the latter being bored to permit spacers 35 and the bolts to pass therethrough. The outer ends of stay plates 31 and 32 are respectively bolted to raised portions 36 of frame 6. Each of plates 31 and 32 adjacent either end thereof is provided on its under surface with notches 37 parallel to and within the corresponding rows of end bolts, while the members to which said plates are bolted have similar notches 38 on their upper surfaces, into which the ends of the plates fit and through which they are bolted, each pair of notches thus forming an interlocking joint. Plates 31 and 32 serve to hold bearing 5 rigidly against longitudinal or lateral movement, but because of their relative thinness and because of notches 37 these plates have a high degree of vertical flexibility. As no end thrust from trunnion 3 is rigidly transmitted to bearing 5, the only horizontal forces acting upon bearing 5 will be those due to sliding or turning friction between trunnion and bearing, or to the difference in level between the two rails, or to lateral inertia when turning curves, or to accidental forces which likewise will ordinarily be of relatively small magnitude. Such forces will in large measure be taken up by stay plates 31 and 32, which thus will relieve ring 26 of undue pressure, while ring 26 will take up the slight turning moment due to the friction of trunnion 3 in bearing 5 when the car is being tilted. Plunger 21 is thus constrained to bear vertically upon diaphragm 19 with a minimum of lateral friction.

Pressure gauge 30 is shown in detail in Figure 7, the central portion of the dial being removed to reveal the interior mechanism. It consists of an outer casing 39, upon which is rotatably mounted an annular outer dial 40 and concentrically therewith an inner dial 41. Dials 40 and 41 are respectively provided with adjusting knobs 42 and 43, each carrying a pinion which engages a face gear on the rear of its respective dial, thus permitting rotation to obtain a zero setting. One of these dials is used for gross weight of car and contents, while the other is set to read the net weight of the contents. Dial pointer 44 is centrally pivoted at 45 and is rigidly secured to pinion 46, which is engaged by a toothed sector 47 pivoted at 48 and rotated by link 49 actuated by Bourdon tube 50 connected as at 51 to pressure tube 29. As the bearing surface of plunger 21 on diaphragm 19 is constant, and as weight is the product of bearing area by the pressure per unit area, dials 40 and 41 may be calibrated directly to read in units of weight. As the volumetric distention of Bourdon tube 50 is extremely slight, and as the liquids employed are practically incompressible, water being compressed only one volume in 300,000 per pound pressure per square inch, and mercury only one in 5,600,-

000, the movement of plunger 21 and of diaphragm 19 will be negligible, not exceeding a few thousandths of an inch.

For cars of the double trunnion type, the arrangement shown in Figure 6 is employed. Parallel trunnions 52 and 53 rest in bearings 54 and 55, both bearings being provided in a single bearing member 56 and the bearing caps being omitted to permit either of trunnions 52 or 53 to be raised and lowered. Beneath each of bearings 54 and 55 respectively and integral with or rigidly secured to bearing member 56 are plungers 57 and 58 similar to plunger 21 previously described. Plungers 57 and 58 constitute the sole vertical support for trunnions 54 and 55, and transmit the weight thereof to weighing cylinders 59 and 60 similar to weighing cylinders 16 previously described. Cylinders 59 and 60 communicate respectively with Bourdon tubes 61 and 62, the respective free ends of which are connected by links 63 and 64 to link 65. The latter, beyond its points of connection with links 63 and 64, is connected by link 66 to toothed sector 67, which is similar to sector 47 previously described and actuates a device similar in all other respects to gauge 30. It will be noted that tubes 61 and 62 function additively in their actuation of the pointer; also that as the respective lever arms on link 65 of links 63 and 64 are different, tubes 61 and 62 should be of different stiffness, in inverse ratio to the lengths of their respective lever arms.

Bearing member 56 is horizontally supported by stay plates 68 and 69 extending outwardly from bearings 54 and 55 respectively, and similar to stay plates 31 and 32. Trunnions 52 and 53 are longer than bearings 54 and 55 respectively, and are disposed therein with sufficient longitudinal clearance to avoid the rigid transmission of end thrust. The corresponding trunnions at the opposite end of the car have suitable thrust collars to hold the car body against longitudinal inertia.

In cars of the multiple trunnion type having four trunnions at each end, plungers 57 and 58, together with weighing cylinders 59 and 60 respectively, will be positioned beneath and preferably between the respective pairs of trunnions on either side. For other arrangements of the trunnions, the plungers and weighing cylinders will likewise be spaced laterally of the direction of the trunnions and positioned so as to distribute the load between them.

When in pouring position the scale pointer on cars of the double trunnion type will not read correctly, because a large portion of the weight of the car body and contents is carried by the tilting crane. As it is desirable to determine accurately the quantity being poured, I have found that the weight of the contents when the car is in pouring position may be indicated in suitable units of net weight by radial graduations 70 on the ends of trunnions 52 and 53, said graduations 70 being read against marks 71 on respective bearings 54 and 55. Instead of placing graduations 70 radially on the ends of the trunnions, they may be ruled parallel along elements of the cylindrical surface of the trunnion, and read off against the top of the bearing or other suitable fixed mark. Whether radial or parallel, graduations 70 are spaced angularly with respect to the axis of the trunnion, i. e. they are spaced peripherally of the trunnion. The spacing of graduations 70 may be calculated from the known interior dimensions of the car body, or may be determined empirically by observing the pouring positions of known weights of contained metal. While such means are of special value on cars of the double trunnion type, they may also be applied with advantage to central trunnion mounted cars.

What I claim is:

1. The combination with a car body, of a wheeled supporting means therefor, means for moving the car body relative to said supporting means, means for weighing said car body when either fixed or moving with respect to said supporting means, and means for taking up longitudinal thrusts on said car body to avoid transmitting the same to said weighing means.

2. The combination with a dumping car body mounted on trunnions, of a fluid pressure diaphragm and gauge for indicating the weight of the car body contents, a member adjacent a trunnion engaging said diaphragm for transmitting weight to the same, means adjacent said diaphragm for centering said member, and means above said last mentioned means for centering said member and for taking up side thrusts of the car body from said member.

3. The combination with a dumping car body mounted on trunnions, of a fluid pressure diaphragm and gauge for indicating the weight of car body contents, a plunger below a trunnion for transmitting weight to be measured to said diaphragm, a retaining ring around the lower end portion of the plunger, and centering means for said plunger to prevent friction between ring and plunger with movement of plunger and diaphragm.

4. The combination with a dumping car body mounted on trunnions, of bearings for said trunnions, a fluid pressure diaphragm beneath an end portion of said car body, and below said bearings, a pressure gauge connected therewith for indicating the weight of car body contents, and means for centering a bearing with respect to said diaphragm which comprises relatively thin, flexible bracing means for taking up transverse thrusts without supporting any portion of the car body weight.

5. In combination with a car, comprising a tiltable car body mounted on trunnions, wheeled trucks, an underframe connecting and carried upon said wheeled trucks, bearings for said trunnions supported by said underframe, and a dumping motor carried upon said underframe and actuating one of said trunnions for tilting the car body therethrough, car body weighing means carried by said underframe and actuated by the weight transmitted through the opposite trunnion.

6. In combination with a car body mounted on trunnions secured to either end thereof, bearings for said trunnions, wheeled supporting means for said bearings, a dumping motor carried by said supporting means at one end of said car body and connected to one of said trunnions for tilting the car body therethrough, a pressure diaphragm interposed between said supporting means and the bearing at the opposite end of the car, and weight indicating means actuated by said pressure diaphragm.

7. The combination with a dumping car body mounted on trunnions, of bearings for said trunnions, a fluid pressure supporting means below at least one of the bearings, a gauge connected with said fluid pressure means, and means for laterally bracing said bearing above said fluid pressure means.

8. In combination with a car, comprising a pair of wheeled trucks in longitudinal alignment, a tiltable car body mounted on trunnions disposed longitudinally of said trucks, bearings normally supporting said trunnions and supported by said trucks, means for transmitting draft and bumping strains between said trucks, and means carried by one of said trunnions and the bearing supporting the same for holding the car body against longitudinal inertia forces, car body weighing means carried by said car and actuated by the weight transmitted through the opposite trunnion.

9. The combination with a car body mounted on trunnions, of a wheeled supporting means therefor, a fluid pressure means at one end of said car body for supporting and weighing the same, and means at the opposite end of said car body from said fluid pressure supporting means for taking up longitudinal thrusts and preventing their transmission to said fluid pressure means.

10. The combination with a car body mounted on trunnions, of a wheeled supporting means therefor, a fluid pressure supported bearing for at least one of said trunnions, and a stay located at about the height of the trunnion axis to take up any lateral thrusts on said bearing.

11. In combination with a car body, wheeled means for supporting either end thereof, means at either end of said car body for transmitting the weight of the same to said supporting means and for holding the car body against lateral movement, means at one end of said car body for holding the same against longitudinal movement, and weighing means interposed in and actuated by said weight transmitting means at the opposite end of said car body.

12. In a hot metal car, a tiltable car body mounted at either end upon a plurality of trunnions, supporting means for said trunnions, car body weighing means operative when the car body is in normal position, and means for indicating the weight of the contents of the car body when the latter is in pouring position.

13. In a hot metal car, a tiltable car body mounted at either end upon a plurality of trunnions, supporting means for said trunnions, tilting means for said car body, and means for indicating the weight of the contents of said car body when the same is in pouring position.

14. In a hot metal car, a tiltable car body mounted at either end upon a pair of trunnions, supporting means for the trunnions at either end, said supporting means at one end comprising a bearing member having a bearing for each trunnion, a pressure diaphragm positioned beneath each of the trunnions at said end and carrying said bearing member, wheeled supports for said trunnion supporting means, means for holding the car body against lateral and longitudinal movement with respect to said wheeled supports, and weight indicating means actuated by said pressure diaphragms.

15. In a hot metal car, a tiltable car body mounted at either end upon a plurality of trunnions, supporting means for the trunnions at either end, said supporting means at one end comprising a bearing member having a bearing for each trunnion, a pair of laterally spaced pressure diaphragms carrying said bearing member, wheeled supports for said trunnion supporting means, means for holding the car body from lateral and longitudinal movement with respect to said wheeled supports, and weight indicating means actuated by said pressure diaphragms.

16. In a hot metal car, a tiltable car body mounted on trunnions, supporting means for the trunnions, a pair of diaphragm means responsive to fluid pressure and positioned in said supporting means and each bearing the weight from one of said trunnions, wheeled supports for said supporting means, means for holding the car body against lateral and longitudinal movement with respect to said wheeled supports, and weight indicating means actuated by the pressure of the fluid within said diaphragm means, comprising a dial, a pointer, a pair of Bourdon tubes connected respectively to said diaphragm means, and means actuated by said Bourdon tubes for rotating said pointer to indicate additively the total weight on said diaphragm means 17. In a car, a tiltable car body mounted on trunnions, supports for the trunnions, a car frame carrying said supports, wheeled supports carrying said car frame, a weighing device on said car frame positioned beneath and actuated by one of said trunnion supports, said trunnion support comprising a bearing member having a bearing for the trunnion, and a pair of horizontally disposed vertically flexible stay plates secured at their inner ends to said bearing member and at their outer ends to said car frame.

18. In a car, a tiltable car body mounted on end trunnions, supports for the trunnions, a car frame carrying said supports, wheeled supports carrying said car frame, a weighing device on said car frame positioned under and actuated by one of said trunnion supports, and means for supporting the car body against longitudinal inertia forces without transmitting the same through said weighing device.

19. In a car, a tiltable car body mounted on end trunnions, supports for the trunnions, a car frame carrying said supports, wheeled supports carrying said car frame, a weighing device on said car frame positioned under and actuated by one of said trunnion supports, means for supporting the car body against longitudinal inertia forces without transmitting the same through said weighing device, and means supplemental to said weighing device for supporting the car body against lateral forces.

20. The combination with a car body mounted on trunnions, of a wheeled supporting means therefor, a fluid pressure supported bearing for at least one of said trunnions, and flexible stays attached to said bearing to take up any lateral thrusts thereon.

Signed at Mount Washington, in the city of Baltimore and State of Maryland, this 14th day of July A. D. 1921.

JOHN D. PUGH.